Sept. 23, 1958  W. C. SCHOFIELD  2,853,289
SINTERING MACHINE
Filed Oct. 11, 1955  4 Sheets-Sheet 1
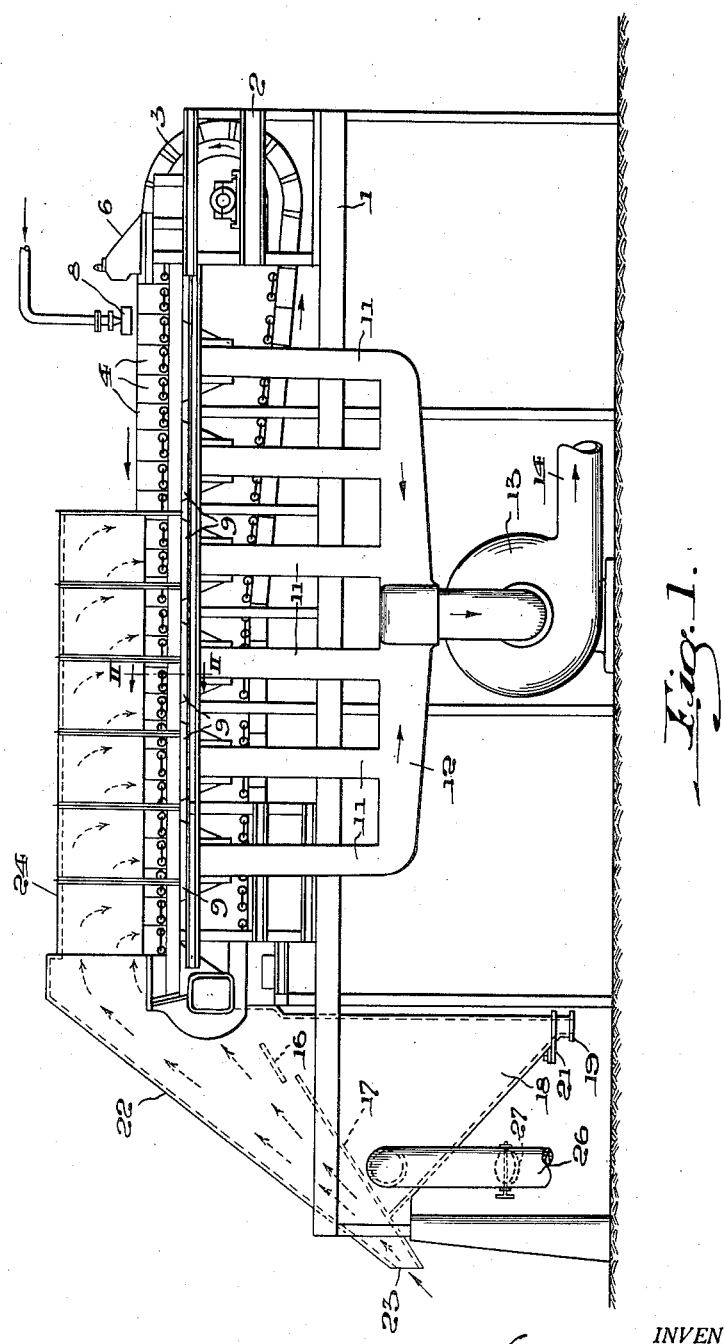
INVENTOR.
WILFRED C. SCHOFIELD.
BY
Ralph B. Buck
his ATTORNEY Sept. 23, 1958     W. C. SCHOFIELD     2,853,289
SINTERING MACHINE
Filed Oct. 11, 1955                        4 Sheets-Sheet 2
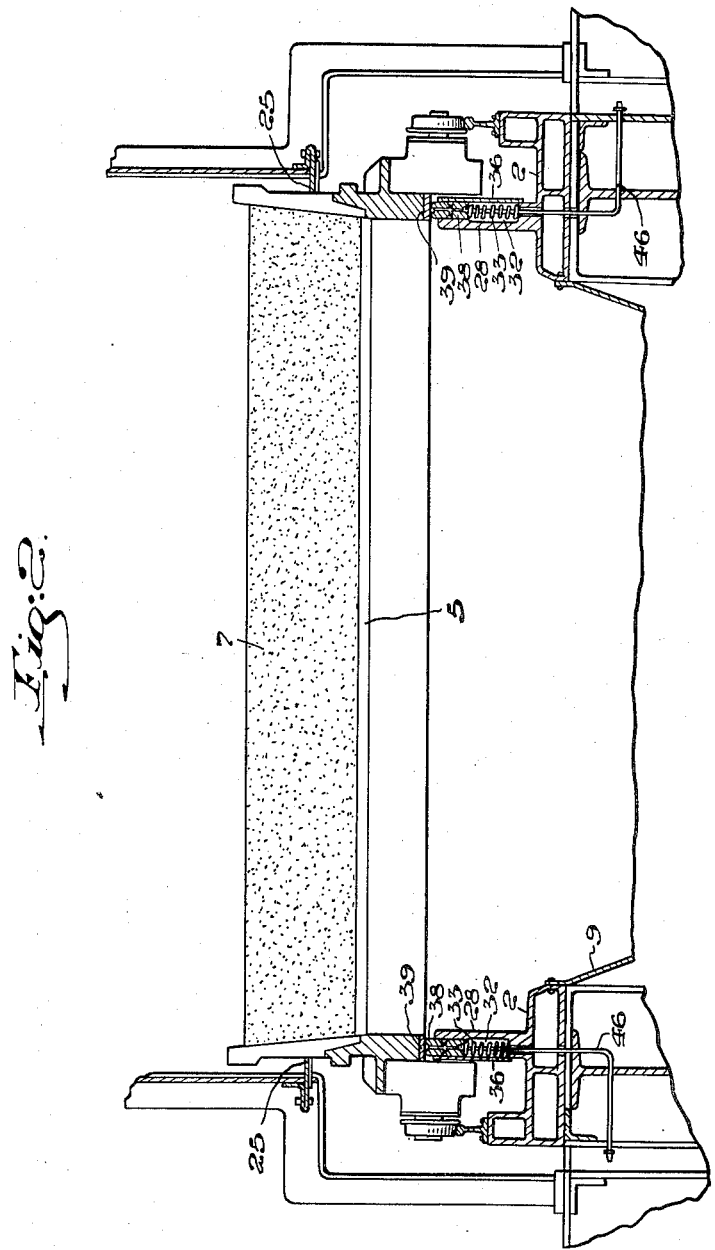
INVENTOR.
WILFRED C. SCHOFIELD.
BY
Ralph D. Brick
his ATTORNEY.

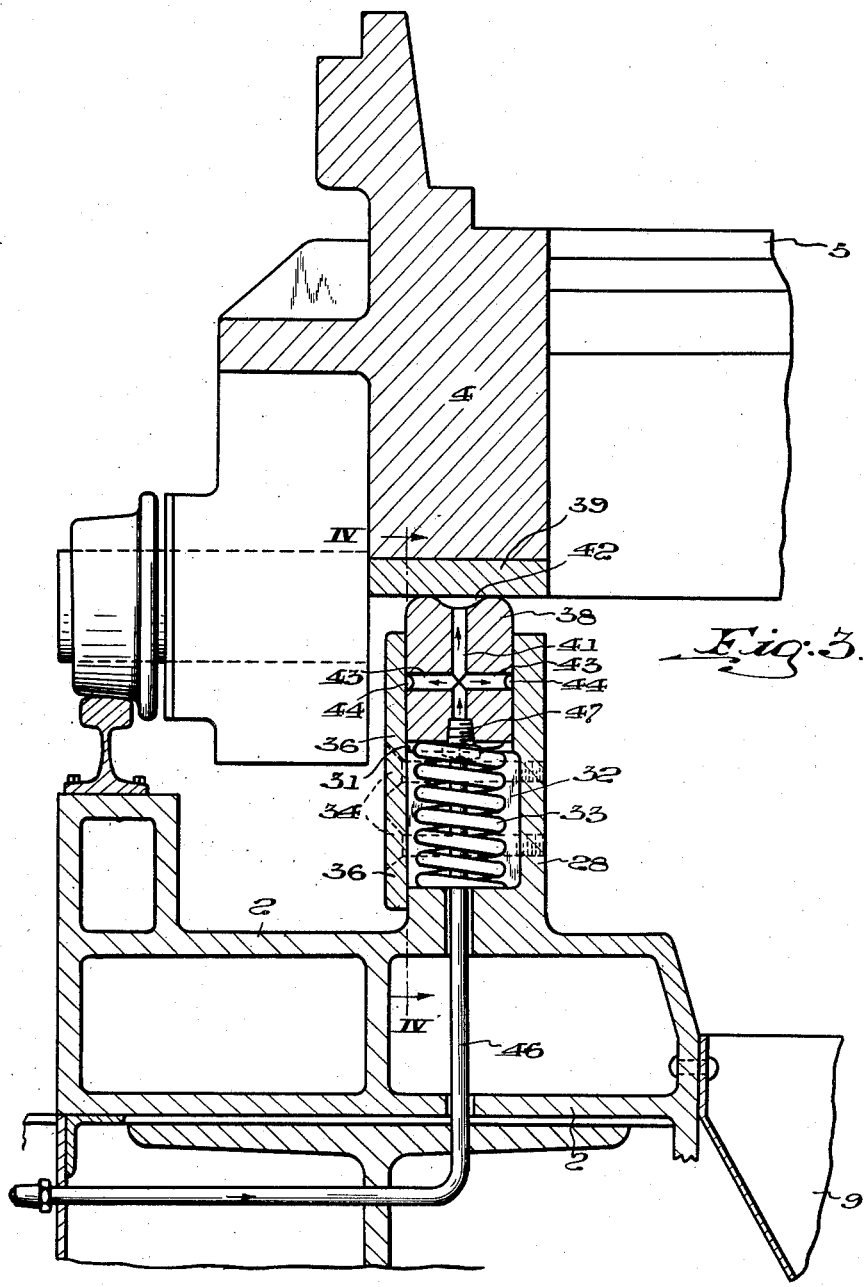

Sept. 23, 1958 W. C. SCHOFIELD 2,853,289
SINTERING MACHINE
Filed Oct. 11, 1955 4 Sheets-Sheet 4
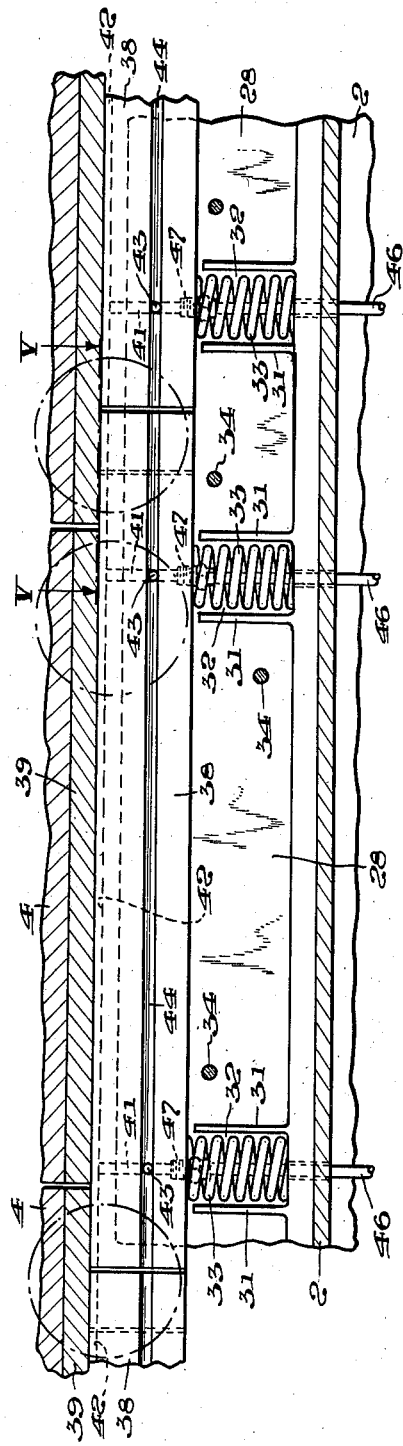
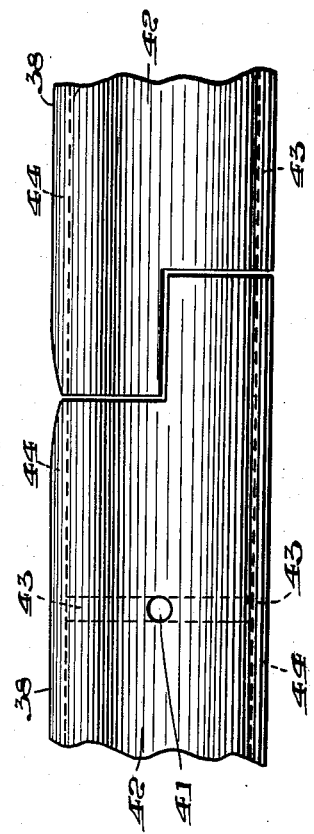
INVENTOR.
WILFRED C. SCHOFIELD
BY Ralph B. Brick
his ATTORNEY.

United States Patent Office 2,853,289
Patented Sept. 23, 1958

2,853,289

SINTERING MACHINE

Wilfred C. Schofield, Chicago, Ill., assignor to Koppers Company, Inc., a corporation of Delaware Application October 11, 1955, Serial No. 539,746

2 Claims. (Cl. 266—21)

This invention relates to apparatus for sintering ores, flue dust and the like wherein wheeled pallets which have grated bottoms upon which the ignited material to be sintered is carried are moved past wind box openings in order to draw air through the material to maintain combustion thereof. More particularly, this invention relates to apparatus for effecting sealing at the wind box openings as the pallets move therepast and to lubricating structure for this sealing apparatus.

In the operation of a sintering machine, particularly the continuous down draft sintering machine such as the Dwight & Lloyd type, it is desirable to prevent the access of air into the wind box chamber which air has not passed through the sintering charge of material on the pallets, since the entrance of such air greatly reduces the efficiency of sintering operations. To accomplish this, various sealing devices have been used to seal the space between the pallets and the top portions of the sides of the wind box openings as the grated pallets pass over such openings.

In constructions previously used for this purpose, difficulties have arisen in installing these sealing devices quickly and for easy replacement. Further, difficulties have arisen in properly lubricating these devices for motion between the moving pallets and the sides of the wind boxes, loose sinter and dust frequently wedging between the moving parts and binding the same. In addition, such loose sinter and dust has created difficulties in lubricating for the motion of the pallets relative the wind box openings.

The present invention avoids these aforementioned difficulties providing a straightforward, efficient, readily installable and replaceable sealing means for effectively and economically sealing the space between the wind box openings of a sintering machine and the pallets moving therepast. The present invention further provides an effective lubricating system for lubricating this sealing means. Various other features of the invention will become obvious with a reading of the disclosure set forth herein.

The invention comprises in one advantageous embodiment a sintering machine having wind box means with an opening at one end, pallet means spaced from the wind box means and movable past the opening, sealing means movable between the wind box means and the pallet means to seal the space therebetween when the pallet means moves past the opening, and lubricating means cooperable with the sealing means to simultaneously lubricate for the motion of the sealing means as it moves to sealing position and for the motion of the pallet means as it moves relative the wind box means.

It is to be understood that various changes can be made by one skilled in the art in the arrangement, form, and construction of the apparatus disclosed without departing from the scope or spirit of this invention.

Referring to the drawings:

Figure 1 is a side view of the sintering machine embodying the invention;

Figure 2 is an enlarged fragmentary sectional view of the machine of Figure 1 taken in a plane passing through line II—II of Figure 1;

Figure 3 is an enlarged fragmentary sectional view of the sealing means shown on the left hand portion of Figure 2;

Figure 4 is a fragmentary sectional view of the sealing means of Figure 3 taken in a plane passing through line IV—IV of Figure 3;

Figure 5 is a fragmentary sectional plan view of the sealing means of Figure 4 taken in a plane passing through line V—V of Figure 4 on a slightly enlarged scale.

The invention can be embodied in any one of a number of types of sintering machines and, by way of example, is disclosed as embodied in a continuous sintering machine of the Dwight & Lloyd type similar to the machine disclosed in Patent No. 2,254,323, issued to Edward W. Shallock on September 2, 1941. The construction and operation of this type of sintering machine are well known in the art and a brief description thereof will suffice. The sintering machine as shown in Figure 1 is mounted on a suitable platform or floor 1 and comprises a suitable frame 2 carrying an endless track 3 having an upper and lower horizontal run upon which travels a train of pallets 4. At the feed end of the machine, the pallets are raised by known means from the lower run of the track about the return bend to the upper run. Each pallet carries a suitable grate 5 (Figure 2) and the pallets on the upper run of the track are in endwise contact providing a continuous traveling grate structure, the pallets being wheel mounted for travel on the track as is known. Charging chute 6 is positioned at the feed end of the machine to provide to the pallets a bed of material 7 to be sintered, the bed being supported by the grate structure and traveling therewith. The pallets pass along the upper run of track 3 from charging chute 6 to igniter 8 where the top of the bed of material 7 is ignited. During the remainder of the travel of the pallets along the upper run, they pass over wind boxes 9. These boxes are connected by conduits 11 to a manifold 12 which in turn is connected to the intake of suction fan 13, the outlet of fan 13 being connected to a conduit 14 which goes to a stack which can discharge into the atmosphere. A suitable dust collecting system can be provided between manifold 12 and fan 13 if so desired.

During travel of the pallets over wind boxes 9, air in large volume is drawn downward through the bed of material 7 causing down-draft combustion therein from the top to the bottom of the bed, so that the bed of material has been completely sintered by the time it reaches the discharge end of the machine, as is known in the art. As the pallets pass from the wind boxes to the lower run of track 3, the sinter on these pallets is discharged onto inclined guide plate 16 and then directed to screen 17 formed of grizzly bars where it is broken up to a certain extent. The fines and smaller pieces of sinter pass into bin 18 positioned below the screen and provided with a discharge spout 19 normally closed by a valve 21 of suitable type. Positioned above the screen 17 is a casing 22 which is provided with discharge spout 23 through which the larger pieces of sinter pass from the inclined screen 17. A hood 24 connects to the upper end of the casing 22 and extends over a portion of the upper run of the conveyor means. As is known in the art and as can be seen in Figure 2, sealing members 25 are provided for effecting substantially airtight seals between the side walls of hood 24 and the sides of pallets 4.

The fan 13 is of sufficient capacity to handle the required volume of air, causing the air to enter into the casing 22 through the spout 23 and also through the conduit 26 connected, for example, to dust areas in other parts of the sintering plant. A damper 27 is provided in conduit 26 for controlling the airflow therethrough. The air passes over the sinter that is moving toward discharge spout 23 to cool this sinter and to remove therefrom the dust and fine particles of material which otherwise would be discharged therewith, the suction fan causing these fine particles of material to be returned to the bed of material 7 for full utilization thereof. The apparatus so far described is conventional in the sintering art and it is to be understood that the inventive structure described hereinafter is not limited in its application to the specific sintering machine embodiment disclosed but can be readily incorporated in any one of a number of other well known types of sintering machines.

Referring to Figures 2 to 4 of the drawings, it can be seen that frame 2 of the sintering machine disclosed is constructed to form the top portions of the sides of the wind boxes 9. In this connection each of these top portions comprises a longitudinally extending upright wall 28 and integral therewith, in turn, are spaced apart pairs of transverse ribs 31 (Fig. 4), each pair of ribs 31 forming a compartment 32. A helical compression spring 33 is inserted in each compartment, the purpose of which spring will be seen hereinafter. Spaced from wall 28 by the transverse ribs 31 and held in substantially parallel position by screws 34 which engage in wall 28 is a second longitudinally extending upright wall 36, the spaced apart walls 28 and 36 thus forming a continuous longitudinally extending slot above the ribs 31 into which are quickly and easily nested with sufficient clearance for floating, vertical sliding movement, the readily replaceable, longitudinally extending, half lapped (Figure 5) seal or bearing bars 38. Bars 38 float on the tops of the compression springs 33 in the slots to be urged vertically upward by the springs 33 against wearing bars 39 which are attached to the underside of pallets 4 in one of any number of known ways (not shown). In this connection, suitable detent means also well known in the art (not shown) can be provided where needed to prevent the bars from being urged completely out of the slot by the springs 33 when the bars are not in engagement with the wearing bars. It is to be noted that instead of using one continuous seal bar throughout the entire length of the slot, several bars are used in end to end arrangement for easier handling and more effective sealing, the aforementioned half lap arrangement of adjacent bar ends (Figure 5) preventing leakage of air at such adjacent ends when the pallets pass over the wind box openings.

As is also well known in the art and therefore not disclosed in detail, dead plates are provided at either end of the row of wind boxes over which the whole width of the pallets slide to prevent leakage of air at these points.

Referring particularly to Figures 3 and 4 of the drawings, each seal bar 38 is provided with spaced apart vertical fluid passages 41, each passage extending from the lower surface to the upper surface of the bar. These passages are spaced from each other and are in alignment with the previously described spring compartments 32, each passage communicating at the upper surface of its seal bar with a top lubrication channel 42 extending longitudinally along such upper surface. Accordingly, when the upper surface of seal bar 38 is urged by springs 33 into sealing contact with wearing bar 39 on the underside of a pallet 4, top lubricating channel 42 is substantially enclosed to form a reservoir shielded from the undesirable loose sinter and dirt so common in sintering operations.

As can also be seen in Figures 3 and 4, in communication with and extending transversely of each vertical passage 41 in each seal bar is a horizontal passage 43 which is connected to side lubrication channels 44 extending longitudinally along either side of the bar. Since each seal bar nests between the upright walls 28 and 36, these side channels are also substantially enclosed to form side reservoirs shielded from the aforementioned undesirable loose particles of sinter and dirt.

In order to provide lubricating fluids to the top and side channels simultaneously through the vertical and horizontal passages 41 and 43, a conduit 46, leading from a lubricating source (not shown) and passing through the helical spring 33 in each compartment 32, is connected to the lower end of each of the vertical fluid passages 41 by means of screw plug 47. Thus, when lubricating fluid is passed through conduit 46, it passes through communicating vertical and horizontal fluid passages 41 and 43 simultaneously to enter the shielded top and side channels 42 and 44. In this manner, lubrication is effected simultaneously for the vertical motion of the seal bars 38 relative the spaced apart enclosing side walls 28 and 36 and for the motion of the pallets 4 as they move relative the wind boxes 9, the wearing bars 39 sliding in lubricated manner over the spring urged seal or bearing bars 38.

Through the structure disclosed above, a readily installable and replaceable seal has been provided which not only includes a means for supplying a lubricant to the bearing surface of the seal or bearing bars so that the wearing bars of the pallets may slide easily on the seal bars of the wind box and form substantially airtight seals, but which further assures that lubrication for the motion of the seal bars toward the wearing bars is simultaneously taken care of, both lubricating systems being shielded from the undesirable loose dirt and sinter common in sintering machine operations.

The invention claimed is:

1. A sintering machine comprising an open-ended wind box having side walls, a pallet movable past said wind box and including wearing bars above said wind box side walls, a sealing bar engageable with one of each of said wearing bars for sealing the space between said pallet and said wind box when said pallet moves past said opening, an upright channel formed on the wind box side walls supporting said sealing bars for vertical sliding movement, spring means engageable with said sealing bar for yieldably holding said sealing bar in sliding contact with its respective wearing bar, a first lubricating passage formed in said sealing bar to supply lubricant to said upright channel, and a second passage formed in said sealing bar communicating with and arranged normal to said first passage to supply lubricant simultaneously to the slidably contacting surface of said sealing bar.

2. A sintering machine comprising a wind box means having side walls forming an opening at one end, pallet means spaced from said wind box means and movable relative thereto past said opening, said side walls forming said opening having slots disposed therein, sealing means comprising several longitudinally extending, lapped and end-to-end position bars nested in said slide and yieldably movable between said wind box means and said pallet means to seal the space therebetween when said pallet means moves past said opening.

References Cited in the file of this patent
UNITED STATES PATENTS

| 1,140,710 | Plock | May 25, 1915 |
| 1,197,199 | Gayley | Sept. 5, 1916 |
| 1,774,135 | Fassotte | Aug. 26, 1930 |
| 1,880,146 | Morison | Sept. 27, 1932 |
| 2,563,135 | Rowen | Aug. 7, 1951 |
| 2,710,183 | Urban | June 7, 1955 |